United States Patent [19]

Alary et al.

[11] Patent Number: 5,417,069

[45] Date of Patent: May 23, 1995

[54] SEPARATOR FOR AN ANNULAR GAS TURBINE COMBUSTION CHAMBER

[75] Inventors: Jean-Paul D. Alary, Saint Maur les Fosses; Michel A. A. Desaulty, Vert Saint Denis; Christophe Pieussergues, Nangis; Denis J. M. Sandelis, Nangis; Pierre M. V. E. Schroer, Brunoy, all of France

[73] Assignee: Societe Nationale D'Etude et de Construction de Moteurs D'Aviation (S.N.E.C.M.A.), Paris, France

[21] Appl. No.: 253,912

[22] Filed: Jun. 3, 1994

[30] Foreign Application Priority Data

Jun. 3, 1993 [FR] France ................. 93 06634

[51] Int. Cl.$^6$ ............... F02C 3/14; F23R 3/16
[52] U.S. Cl. .................... 60/747; 60/756
[58] Field of Search ............ 60/747, 39.36, 752, 60/753, 755, 756, 757

[56] References Cited

U.S. PATENT DOCUMENTS

| | | | |
|---|---|---|---|
| 4,194,358 | 3/1980 | Stenger | 60/39.36 |
| 4,292,801 | 10/1981 | Wilkes et al. | 60/747 |
| 4,555,901 | 12/1985 | Wakeman et al. | 60/39.32 |
| 5,197,278 | 3/1993 | Sabla et al. | 60/747 |
| 5,289,687 | 3/1994 | Kress et al. | 60/747 |

FOREIGN PATENT DOCUMENTS

| | | |
|---|---|---|
| 0564170 | 10/1963 | European Pat. Off. . |
| 0488557 | 6/1992 | European Pat. Off. . |
| 0491478 | 6/1992 | European Pat. Off. . |
| 260957 | 4/1949 | Switzerland . |
| 2010408 | 6/1977 | United Kingdom . |
| 2003554 | 3/1979 | United Kingdom . |

OTHER PUBLICATIONS

Burrus, D. L., et al. "Energy Efficient Engine: Combustion System Component Technology Development Report", NASA R82AEB401. Nov. 1982. pp. 50, 341, and 397.

*Primary Examiner*—Timothy S. Thorpe
*Attorney, Agent, or Firm*—Bacon & Thomas

[57] ABSTRACT

A separator for an annular gas turbine engine combustion chamber is disclosed having a plurality of separator segments arranged in a generally annular configuration to form an annular separator extending from an upstream end wall of a combustion chamber into the combustion chamber so as to separate first and second combustion zones within the combustion chamber. Each of the separator segments has a hollow interior defined by a front wall, an outer wall, an inner wall which has at least a portion tapering or converging towards the outer wall in a direction extending away from the front wall, and first and second sides. The sides define an array of holes communicating with the hollow interior, the positioning of the array of holes on a first sides being different from that of the array of holes on the second sides such that the axes of the holes are out of alignment with each other. The first sides of one separator segment is positioned adjacent to, but spaced apart from a second sides of an adjacent separator segment. Since the array of holes on the first sides is out of alignment with the array of holes on the second sides, pressurized gas within the interior of the hollow segment will pass through the holes in the first and second sides and will impinge upon the adjacent sides so as to cool both the adjacent sides and the sides through which the gas passes.

11 Claims, 5 Drawing Sheets

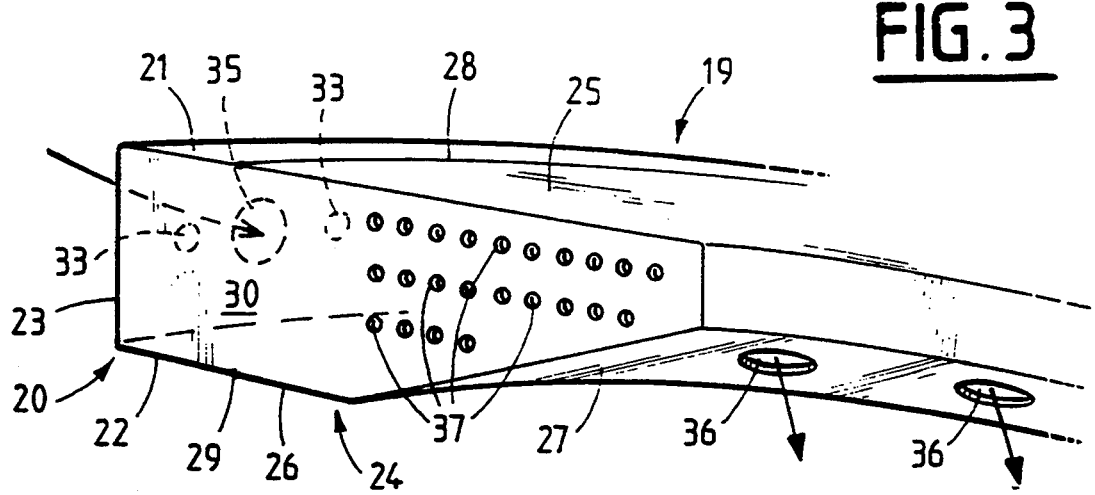
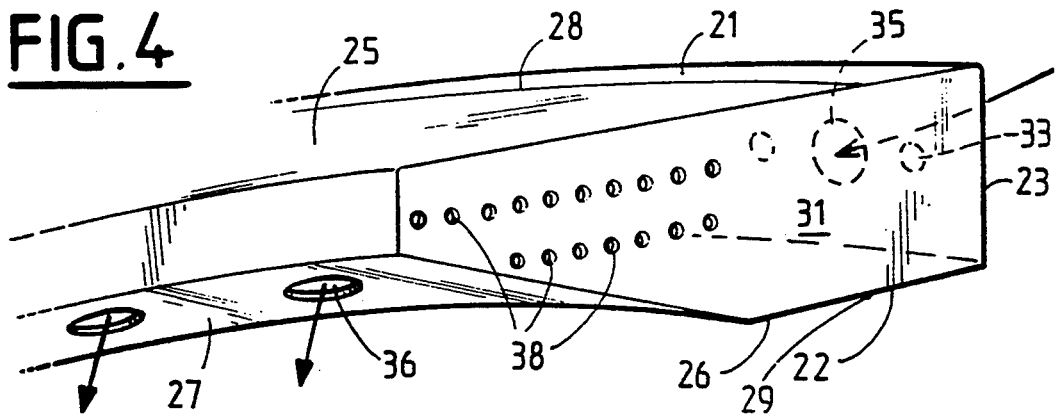
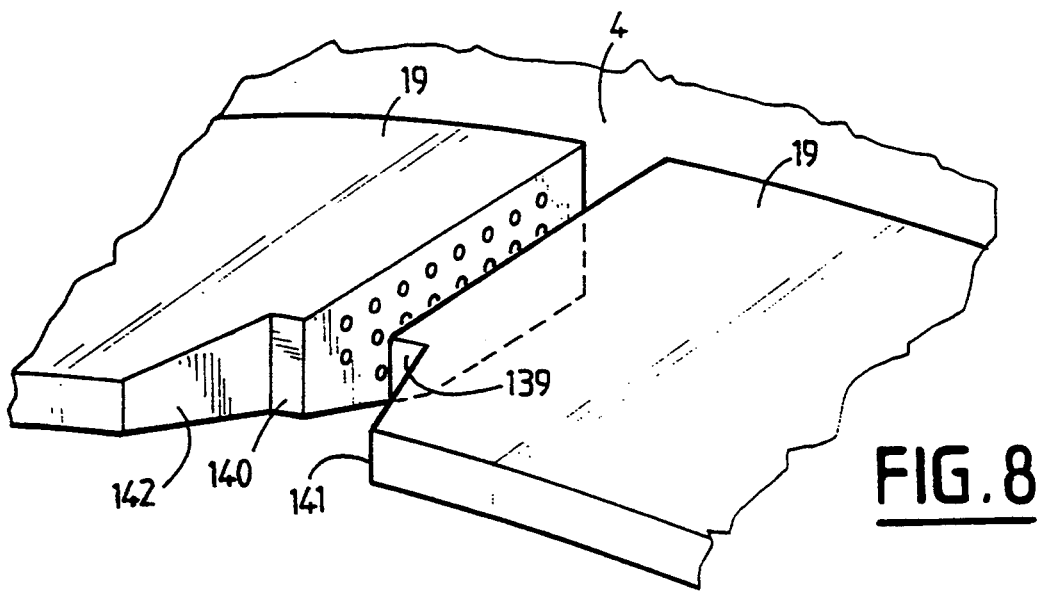

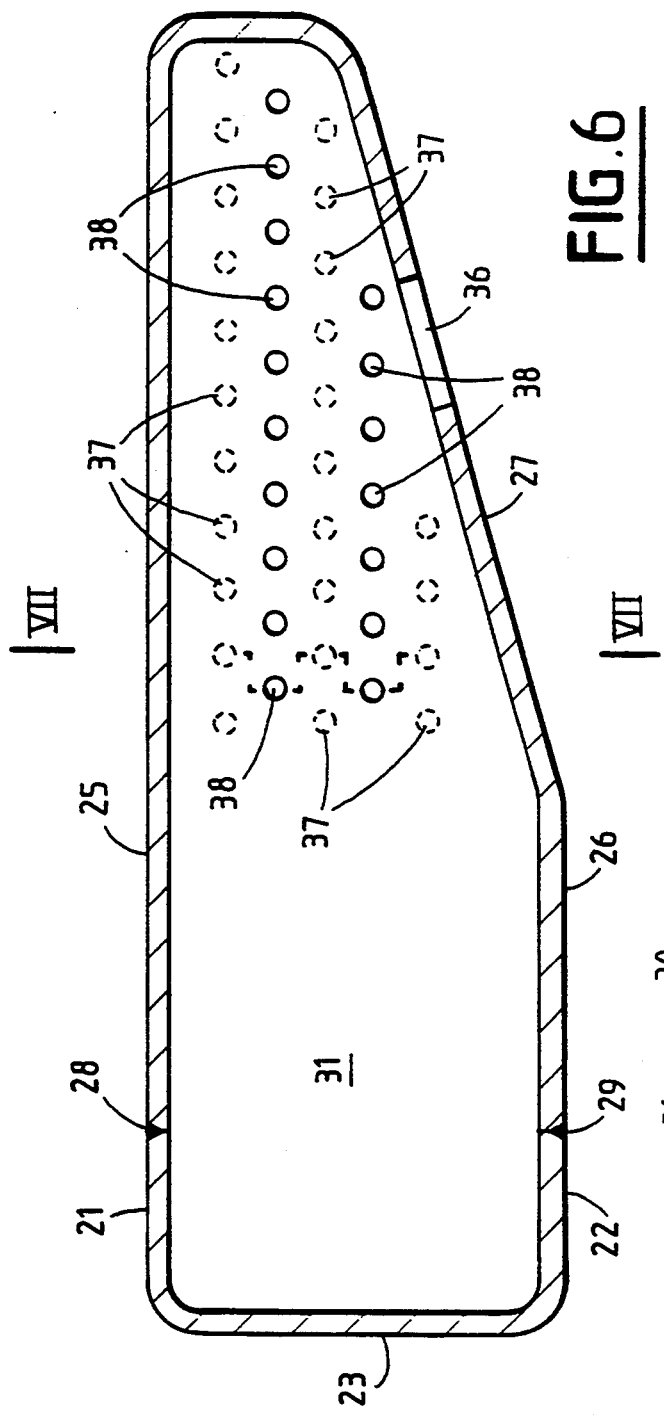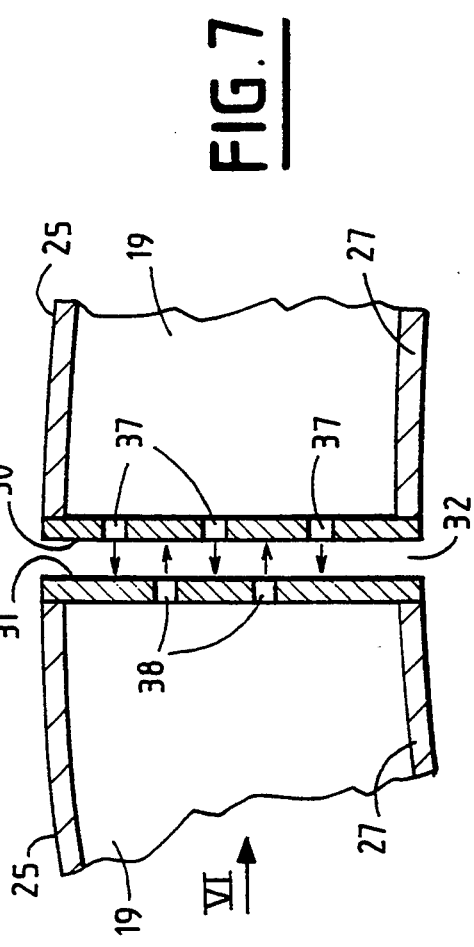

SEPARATOR FOR AN ANNULAR GAS TURBINE COMBUSTION CHAMBER

BACKGROUND OF THE INVENTION

The present invention relates to a separator for an annular gas turbine engine combustion chamber which separates the combustion zones of such a combustion chamber having two or more combustion zones within the combustion chamber.

In order to achieve lower pollution, modem gas turbine aircraft engines make use of an annular combustion chamber having two or more arrays of fuel injectors injecting fuel into two or more combustion zones within the combustion chamber. One of the fuel injector arrays and one of the combustion zones operates during low power engine operation, while the other fuel injector array and combustion zone operates under take-off or full power conditions.

Typically, such known combustion chambers comprise two mutually spaced apart, generally annular walls extending around a longitudinal axis of the engine joined at an upstream end by a wall which extends generally radially relative to the longitudinal axis and interconnects the spaced apart annular walls. Two distinct arrays of fuel injectors, both of which extend generally in an annular array about the longitudinal axis extend through the upstream end wall of the combustion chamber and serve to inject fuel into two combustion zones within the combustion chamber. The first array of fuel injectors supplies fuel in a first mode of engine operation, such as under low power operating conditions, while the second array of fuel injectors supplies fuel into a second combustion zone during a second mode of engine operation, such as at take-off under full-power. Oxidizer intake passages may also be defined by the upstream end wall to enable oxidizer to pass into the combustion chamber zones so as to support combustion therein. It is also known to have a gas separator extending from the upstream end wall of the combustion chamber into the combustion chamber located between the two annular arrays of fuel injectors to separate the first and second combustion zones.

The gas flow separator assembly represents a critical factor in designing a combustion chamber since it is subjected to longitudinal and transverse stresses during the combustion chamber operation. In a typical gas turbine engine of this type, ignition of the fuel initially takes place in a first combustion zone which is served by the pilot injectors during lower power operating conditions. Under these conditions, typically while the aircraft is on the ground, combustion is stabilized within the first combustion zone and is supplied fuel only by the first array of pilot injectors, which are the only injectors operating. During engine acceleration, typically an operation corresponding to approximately 20% of the take-off thrust, the second fuel injector array, or take-off injectors supply fuel to the second combustion zone. The fuel and oxidizer mixture in the second combustion zone is ignited as the flame propagates from the first combustion zone served by the pilot injectors towards the second combustion zone. It is quite important that fuel from all of the second injector array be ignited substantially simultaneously to insure proper engine operation.

However, ignition malfunctions of the take-off fuel injector array have been repeatedly observed. Such malfunctioning is linked to the lack of direct propagation of the pilot injector flame toward the second combustion zone served by the take-off injectors, the flame front being constrained to move around the gas flow separator between the two arrays of fuel injectors.

European Patent Application 0 564 170 describes a gas flow separator assembly comprising a plurality of distinct separator segments located adjacent to each other to form an annular separator in which each of the separate separator segments are independent of adjacent separator segments. Each of the separator segments comprises an elongated body having opposite sides which are spaced from corresponding sides of adjacent segments.

SUMMARY OF THE INVENTION

A separator for an annular gas turbine engine combustion chamber is disclosed having a plurality of separator segments arranged in a generally annular configuration to form an annular separator extending from an upstream end wall of a combustion chamber into the combustion chamber so as to separate first and second combustion zones within the combustion chamber. The combustion zones are served by separate arrays of fuel injectors which extend through an upstream end wall of the combustion chamber. Oxidizer passes into the combustion zones to be mixed with the fuel and ignited.

The separator segments have a hollow interior defined by a front wall, an outer wall, an inner wall which has at least a portion tapering or converging towards the outer wall in a direction extending away from the front wall and first and second sides. The sides define an array of holes communicating with the hollow interior, the positioning of the array of holes on the first sides being different from that of the array of holes on the second sides such that the axes of the holes are out of alignment with each other. The first sides of one separator segment are positioned adjacent to, but spaced apart from a second sides of an adjacent separator segment. Since the array of holes on the first sides is out of alignment with the array of holes on the second sides, pressurized gas within the interior of the hollow segment will pass through the holes in the first and second sides and will impinge upon the adjacent sides so as to cool both the adjacent sides and the sides through which the gas passes.

The front walls of the separator segments are fastened to the upstream end wall of the combustion chamber and define pressurized gas inlet openings which communicate with the hollow interior and a source of pressurized gas, such as the compressor of the gas turbine engine, so as to enable the pressurized gas to pass into the interior of the separator segment. The inner wall of each separator segment may also define an outlet hole facing towards the combustion zone served by the full power, or take-off fuel injectors to enable pressurized oxidizer to pass directly into the high power combustion zone.

The sides of the separator segments may extend parallel to an adjacent side of an adjacent separator segment, or the side walls may define portions which diverge in a direction extending into the combustion chamber from the upstream end wall.

One of the advantages of a combustion chamber incorporating gas separator according to the present invention is the substantial lowering of longitudinal and tangential stresses to which the prior art separators have been subjected. The circumferential spacing between adjacent ends of the separator segments does not deleteriously affect the performance of the gas turbine engine since undesirable recirculation of the hot gases between the combustion zones is prevented by the pressurized gas passing through the array of holes in the segment ends. The present invention makes possible the desired satisfactory operation and furthermore facilitates flame propagation between the combustion zones to insure proper ignition of the combustion gases in the combustion zone served by the high power or take-off fuel injectors.

BRIEF DESCRIPTION OF THE DRAWINGS

FIG. 3 is a partial, perspective view taken in the direction of arrow F3 in FIG. 2.

FIG. 4 is a partial, perspective view taken in the direction of arrow F4 in FIG. 2.

FIG. 6 is a cross-sectional view taken along line VI—VI in FIG. 2.

FIG. 7 is an enlarged view of area A in FIG. 2.

FIG. 8 is a partial, perspective view of an alternative embodiment of the gas flown separator viewed in the direction of arrow F8 in FIG. 2.

DETAILED DESCRIPTION OF THE PREFERRED EMBODIMENTS

Figure 1:
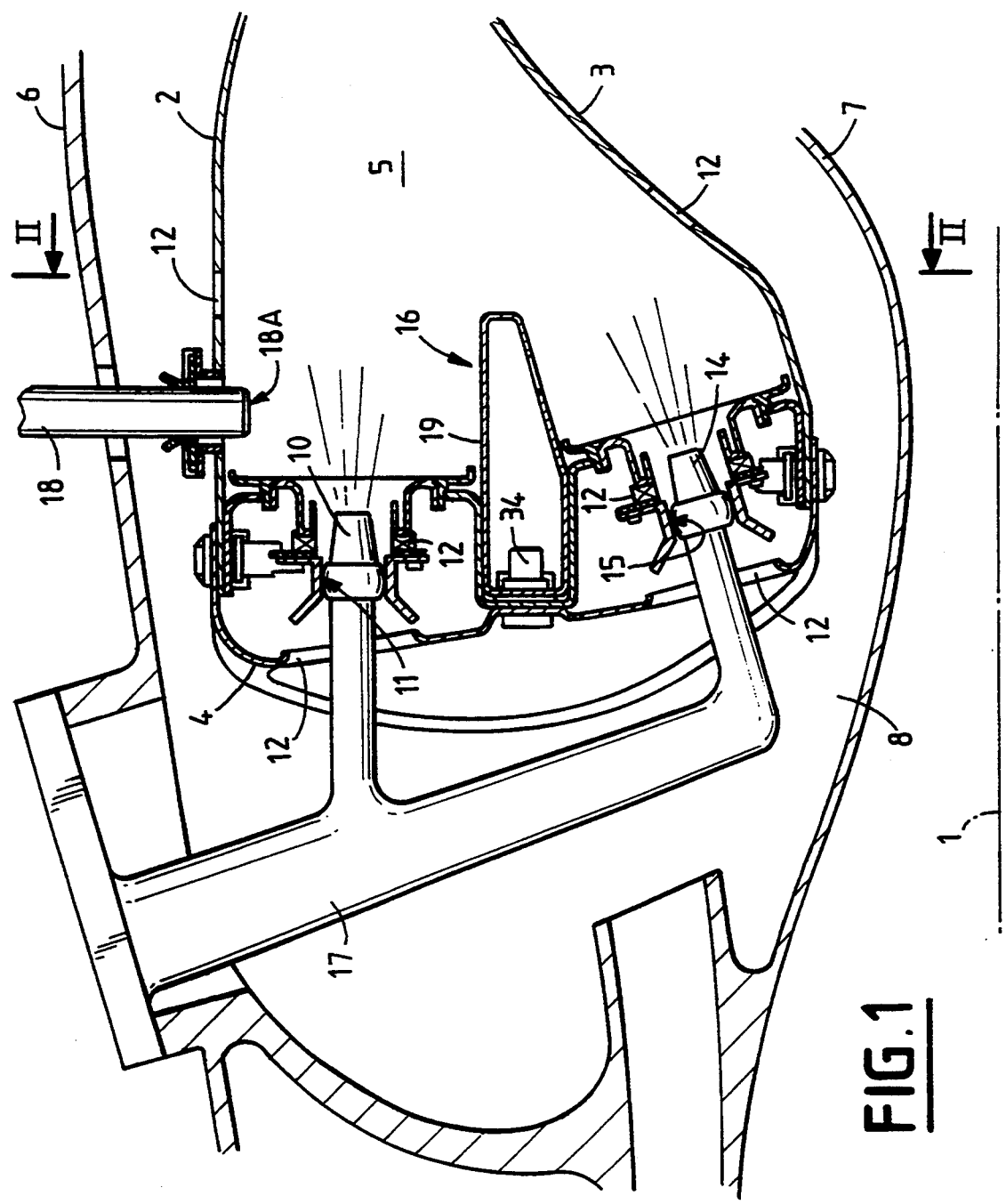
FIG. 1 is a partial, longitudinal, cross-sectional view of a combustion chamber incorporating the gas flow separator according to the present invention.

The gas turbine engine combustion chamber incorporating the gas-separator of the present invention comprises a longitudinal axis of symmetry 1 about which outer wall 2 and inner wall 3 extend in an annular fashion. Upstream end 4 of the combustion chamber extends generally radially to the longitudinal axis 1 and connects the upstream ends of outer annular wall 2 and inner annular wall 3 so as to define combustion chamber 5. Outer casing wall 6 and inner casing wall 7 also extend in annular fashion about longitudinal axis 1 and enclose the aforementioned combustion chamber structure so as to form chamber 8 which is supplied with pressurized oxidizer, such as air, from a stage of the compressor (not shown) of the gas turbine engine, in known fashion.

A first array of fuel injectors 10 are located on annulus 9 which extends about the longitudinal axis 1 such that each of the fuel injectors passes through a hole 11 defined by the upstream end wall 4. The fuel injectors inject fuel into a first combustion zone in the combustion chamber 5 which fuel is, by known means, mixed with oxidizer taken from chamber 8, which also passes through oxidizer passages 12 defined by the outer and inner walls 2 and 3, respectively to support combustion of the fuel within the combustion chamber 5. Under low power engine operating conditions, fuel injectors 10, which are nearest the outer wall 2, operate alone and constitute the pilot fuel injectors.

A plurality of fuel injectors 14 are located on a second annulus 13 having a smaller diameter than the first annulus 9 such that each of the injectors 14 pass through an opening 15 formed in the end wall 4 of the combustion chamber to inject fuel into a second combustion zone of the combustion chamber 5. Again, the injected fuel is mixed with oxidizer in order to support combustion within this combustion zone. Fuel injectors 10 and 14 are both supplied by a main fuel supply conduit 17.

A gas flow separator assembly 16 which is also generally annular in configuration and extends about longitudinal axis 1 is affixed to the upstream end wall 4 of the combustion chamber and extends into the combustion chamber 5 so as to separate the first and second combustion zones. Ignition of the fuel/oxidizer mixture in the first combustion zone is achieved by a spark device 18 having an electrode tip 18A extending into the combustion chamber 5.

Figure 2:
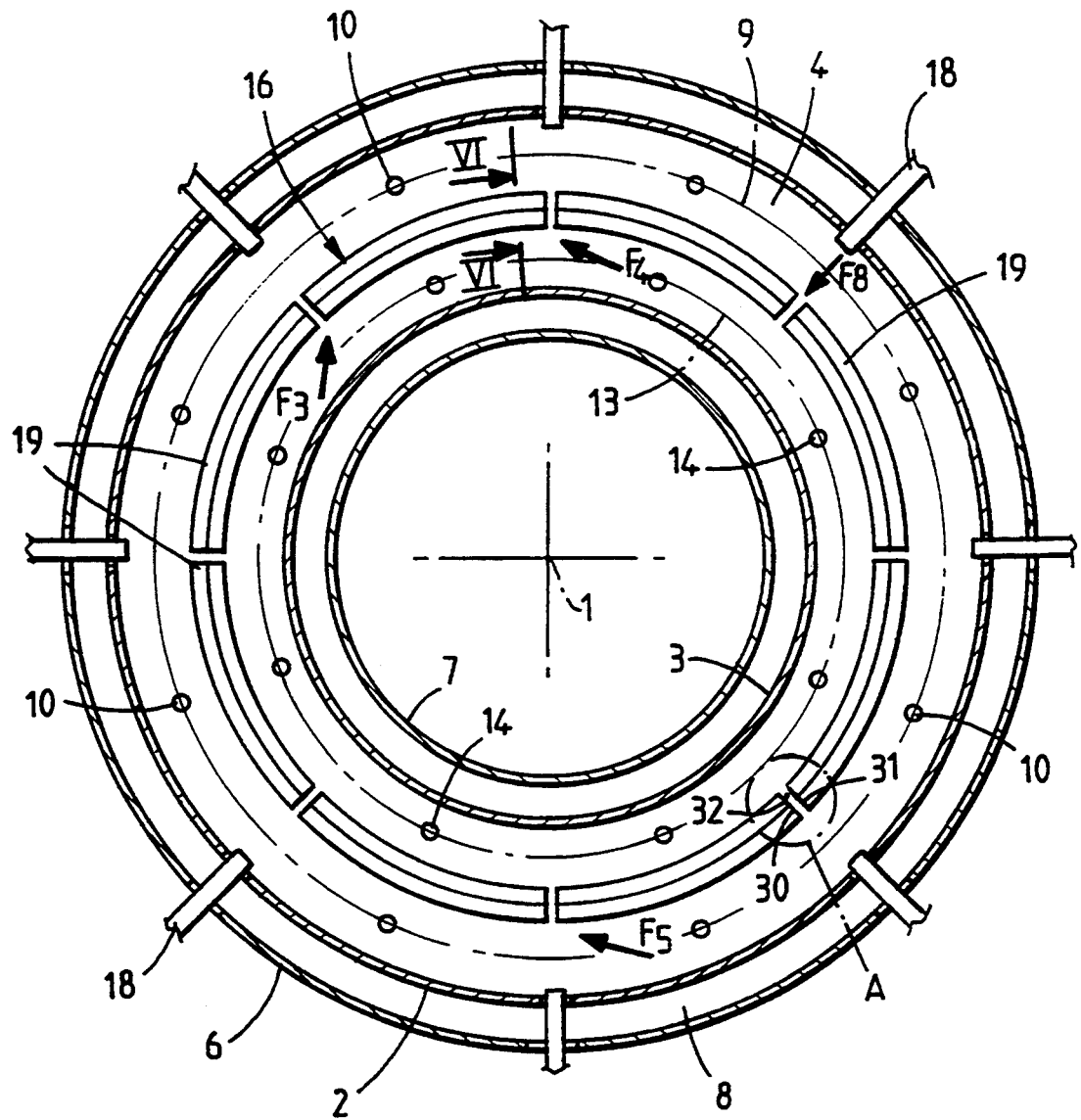
FIG. 2 is a cross-sectional view taken along line II—II in FIG. 1.
Figure 5:
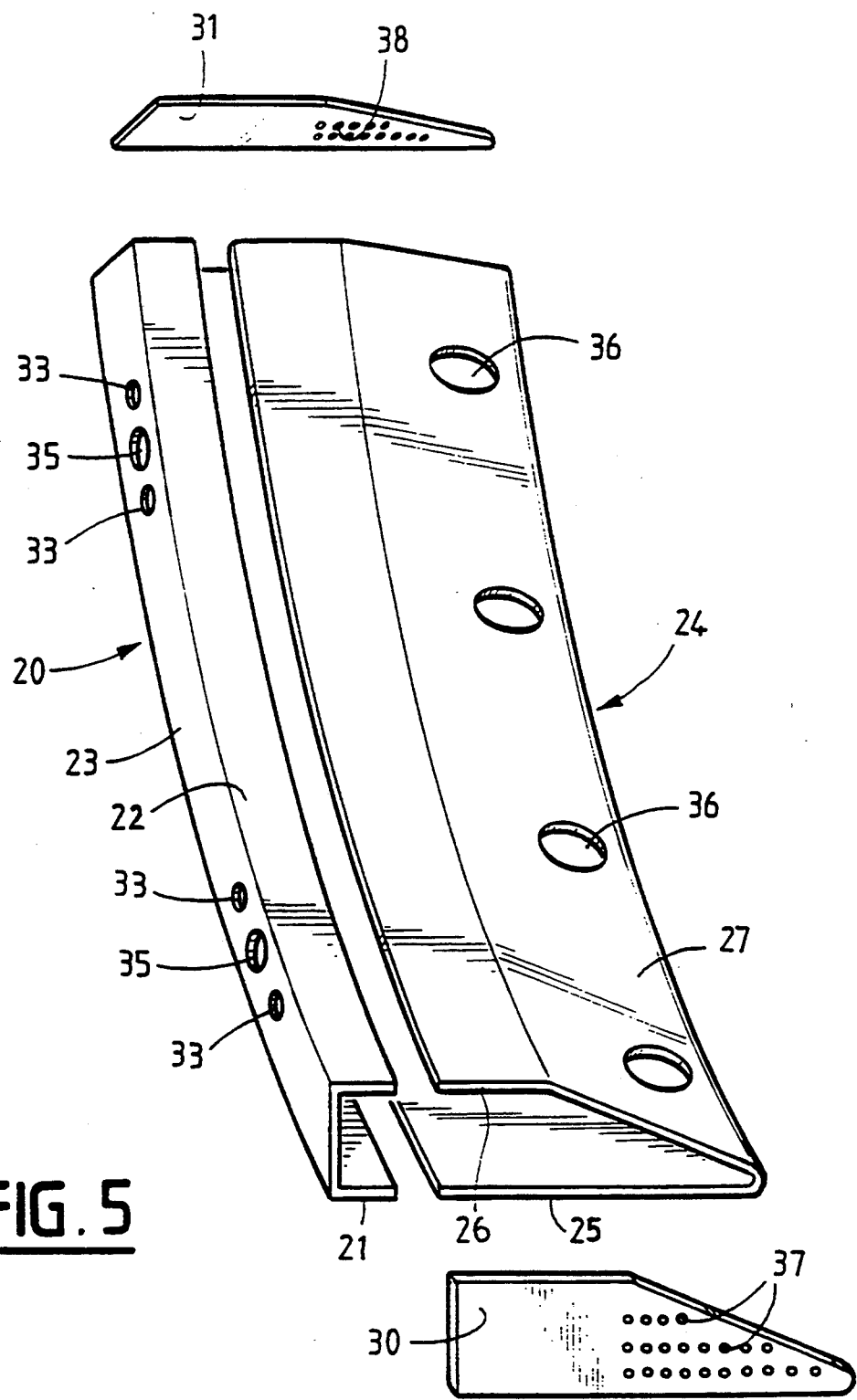
FIG. 5 is an exploded, perspective view viewed in the direction of arrow F5 in FIG. 2.

As best seen in FIG. 2, the gas flow separator assembly 16 comprises a plurality of curved separator segments 19, each separator segment being distinct and separate from the adjacent separator segments and each being attached to the upstream end wall of the combustion chamber by fasteners distinct from those of the other segments 19. A typical construction of each of the separator segments 19 is illustrated in FIGS. 3-5. The separator segments 19 comprise a front portion formed of a U-shaped channel 20 which has an outer leg 21 and an inner leg 22 connected by front wall 23. U-shaped channel 20 is attached to structure 24 which has an outer leg 25 and an inner leg 26 by a first weld seam 28 which connects outer walls 21 and 25, and a second weld seam 29 which connects inner walls 22 and 26. As can be seen, walls 21 and 25 are substantially co-planar, while walls 22 and 26 are also coplanar with each other. Inner wall 26 has a portion 27 which converges toward the outer wall 25 in a direction extending away from the from wall 23 such that this structure has a generally V-shaped cross-sectional configuration.

Each of the separator segments has a first side 30 and a second side 31 of the same size and shape and each are welded about the periphery to the ends of the structures 20 and 24 after these structures have been welded together. Once the structures have been assembled, it can be seen that the separator segment 19 defines a hollow interior. A plurality of such segments are located such that a first side of one segment is adjacent to, but spaced from a second side of an adjacent segment so as to form the annulus 16 located between the annulus 13 and the annulus 9, as can be seen in FIG. 2. The segments defined a space 32 between the adjacent sides.

The front wall 23 defines holes 33 to enable the segment 19 to be attached to the upstream end wall 4 of the combustion chamber by bolts 34. Between adjacent pairs of holes 33, the front end wall 23 also defines a gas inlet opening 35 which is in communication with pressurized oxidizer chamber 8 and enables the pressurized oxidizer to pass into the interior of the hollow separator segment 19. As shown in FIG. 5, the gas inlet opening 35 may be located between a pair of adjacent mounting holes 33.

The gas separator segments are positioned such that the inner walls 22 and 26, as well as the tapered portion 27 face the second combustion zone, used under full power or take-off operating conditions. Portion 27 may define one or more outlet holes 36 facing toward the take-off or high-power fuel injectors 14 to enable the pressurized oxidizer or air within the separator segment 19 to pass into this combustion zone thereby providing additional oxidizer for the full power fuel injectors 14.

The first side plate 30 defines a first array of holes 37 arranged in a first grid pattern which extend through the side 30 so as to communicate with the hollow interior of the separator segment. As can be seen, the holes 37 are primarily located in the portion of the side 30 which is adjacent to the converging walls 27 and 25. Similarly, the second side 31 defines a second array of holes 38 arranged in a second grid pattern. As best seen in FIGS. 6 and 7, the first grid pattern is different from the second grid pattern such that, when a first side of one segment is located adjacent to a second side of an adjacent segment, the holes 37 in the first side are out of alignment with the holes 38 in the adjacent second side. The axes of holes 37 and 38 may also be arranged obliquely with respect to the planes of the sides 30 and 31. As can best be seen in FIG. 7, by placing the holes 37 and 38 such that they are not in alignment with each other, pressurized gas emanating through holes 37 will impinge on the side 31, while pressurized gas emanating from holes 38 will impinge upon side 30. Such impingement serves to cool the respective sides 30 or 31, since the pressurized gas is at a significantly lower temperature than is the atmosphere within the combustion zone. Cooling is also achieved by the pressurized gas flowing through respective holes 37 and 38 which will cool the sides which define the respective holes. One of the functions of holes 37 and 38 is to cool the respective sides 30 and 31 by the pressurized gas tangentially sweeping the sides at the time it escapes from each of the separator segments. For that purpose, the axes of holes 37 or 38 are slanted relative to the plane of the respective side. The second function of holes 37 and 38 is to cool the opposite end by means of the air escaping from the holes and impacting the adjacent side 30 or 31. A third function of the holes 37 and 38 is to prevent hot gas recirculation between the two combustion zones located on either side of the separator assembly through the spaces 32. The pressurized gas escaping through the holes 37 and 38 creates, in each space 32, a pressurized gas blocking means precluding such hot gas recirculation.

In an alternative embodiment, as illustrated in FIG. 8, the sides 30 and 31 are not parallel to the adjacent sides, but include diverging portions. Each segment contains an angled wall portion 141 and 142 oriented such that, when the segments 19 are located adjacent to each other, the walls 141 and 142 diverge from each other in a direction extending away from the upstream end wall of the combustion chamber. Tangential offset portions 139 and 140 join the tapered walls 141 and 142 to the sides 30 and 31, respectively. This design contributes to the improved flame propagation from one combustion zone to the other. In both embodiments, the planes of the sides 30 and 31 extend along the longitudinal axis 1 and pass through the longitudinal axis.

The gas separator assembly according to the present invention provides high strength regarding both tangential and longitudinal stresses in the separator due to the use of separate individual segments 19. The segments provide excellent cooling of the segment sides because of the specific array of holes 37 and 38. The absence of hot-gas recirculation between the two combustion zones is assured by the pressurized gas emanating from the holes 37 and 38 to block the space between adjacent separator segments. The gas separator also eases the ignition of the fuel/air mixture in the full power or take-off combustion zone and improves the full power engine acceleration by reducing the time of such acceleration.

The foregoing description is provided for illustrative purposes only and should not be construed as in any way limiting this invention, the scope of which is defined solely by the appended claims.

We claim:

1. A separator for an annular gas turbine combustion chamber having at least two annular arrays of fuel injectors extending through an upstream end wall of the combustion chamber into at least two combustion zones in the combustion chamber, the separator comprising:
   a) a plurality of individual, circumferentially spaced apart separator segments arranged in a generally annular array to form a separator extending from the upstream end wall into the combustion chamber between the at least two annular fuel injector arrays, at least one separator segment defining a hollow interior and each separator segment having first and second circumferentially spaced apart sides, the segments positioned such that a first side of each separator segment faces and is spaced from a second side of an adjacent separator segment;
   b) first holes defined by the first side of the at least one hollow separator segment;
   c) second holes defined by the second side of the at least one hollow separator segment; and,
   d) means to supply a pressurized gas to the interior of the at least one hollow separator segment such that the pressurized gas passes through the first and second holes to form a pressurized gas blocking means between adjacent separator segments to prevent communication between the at least two combustion zones through the spaced apart ends of adjacent separator segments.

2. The separator of claim 1 wherein the first holes comprise a first array of holes arranged in a first grid pattern.

3. The separator of claim 2 wherein the second holes comprise a second array of holes arranged in a second grid pattern.

4. The separator of claim 3 wherein the array of holes in the first grid pattern is out of alignment with array of holes in the second grid pattern such that the pressurized gas emanating from the first and second array of holes impacts upon a first or second side of an adjacent separator segment.

5. The separator of claim 1 wherein the at least one separator segment defining a hollow interior comprises:
   a) a front wall;
   b) an outer wall extending from the front wall into the combustion chamber; and,
   c) an inner wall extending from the front wall into the combustion chamber and spaced from the outer wall, the inner wall having at least a portion which converges toward the outer wall in a direction extending away from the front wall.

6. The separator of claim 5 further comprising means to attach the front wall of the separator segment to the upstream end wall of the combustion chamber.

7. The separator of claim 5 further comprising a plurality of pressurized gas inlet openings defined by the front wall in communication with the hollow interior and a source of pressurized gas.

8. The separator of claim 5 further comprising at least one outlet hole defined by the inner wall in communication with the hollow interior.

9. The separator of claim 8 wherein the at least one outlet hole is located in portion of the inner wall converging toward the outer wall.

10. The separator of claim 1 wherein the first side of one separator segment extends substantially parallel to a second side of an adjacent separator segment.

11. The separator of claim 1 wherein adjacent first and second sides of adjacent separator segments have at least portions which are divergent in a direction from the upstream end wall into the combustion chamber.

* * * * *